United States Patent
Hsieh et al.

(10) Patent No.: US 7,793,015 B2
(45) Date of Patent: Sep. 7, 2010

(54) METHOD AND APPARATUS FOR DATA RATE CONTROL

(75) Inventors: Tsung-Hsien Hsieh, Taoyuan County (TW); Ray Chih-Jui Peng, San Jose, CA (US)

(73) Assignee: Fortemedia, Inc., Cupertino, CA (US)

( * ) Notice: Subject to any disclaimer, the term of this patent is extended or adjusted under 35 U.S.C. 154(b) by 408 days.

(21) Appl. No.: 12/056,343

(22) Filed: Mar. 27, 2008

(65) Prior Publication Data

US 2009/0245446 A1 Oct. 1, 2009

(51) Int. Cl.
*G06F 13/38* (2006.01)

(52) U.S. Cl. .............................. 710/60; 710/46; 710/18

(58) Field of Classification Search ........................ None
See application file for complete search history.

(56) References Cited

U.S. PATENT DOCUMENTS

| | | | | |
|---|---|---|---|---|
| 4,463,443 A | * | 7/1984 | Frankel et al. ................ | 710/60 |
| 5,440,691 A | * | 8/1995 | Carrafiello et al. ........... | 709/234 |
| 5,771,356 A | * | 6/1998 | Leger et al. .................. | 709/233 |
| 5,999,995 A | * | 12/1999 | Ueno et al. .................... | 710/60 |
| 6,581,164 B1 | * | 6/2003 | Felts et al. ................... | 713/400 |
| 6,738,880 B2 | * | 5/2004 | Lai et al. ..................... | 711/167 |
| 6,795,397 B2 | * | 9/2004 | Varma et al. ............. | 370/230.1 |
| 7,069,356 B2 | * | 6/2006 | Meyer et al. .................. | 710/52 |
| 2006/0209684 A1 | * | 9/2006 | Bei ............................. | 370/229 |

* cited by examiner

*Primary Examiner*—Cheng-Yuan Tseng
(74) *Attorney, Agent, or Firm*—Thomas, Kayden, Horstemeyer & Risley

(57) ABSTRACT

Methods and apparatus for rate control are provided. An isochronous circuit controls data transmission between a first device and a second device. The first device outputs a set of data packets to the isochronous circuit at a first data rate, and the second device pulls the set of data packets from the isochronous circuit at a second data rate. The isochronous circuit comprises a buffer, a rate calculator and a register. The buffer buffers the set of data packets bound to the second device through a USB. The rate calculator monitors occupation of the buffer to estimate the second data rate. The register is coupled to the rate calculator for storage of the second data rate. The first device may access the estimate of the second data rate from the register to update the first data rate.

13 Claims, 6 Drawing Sheets

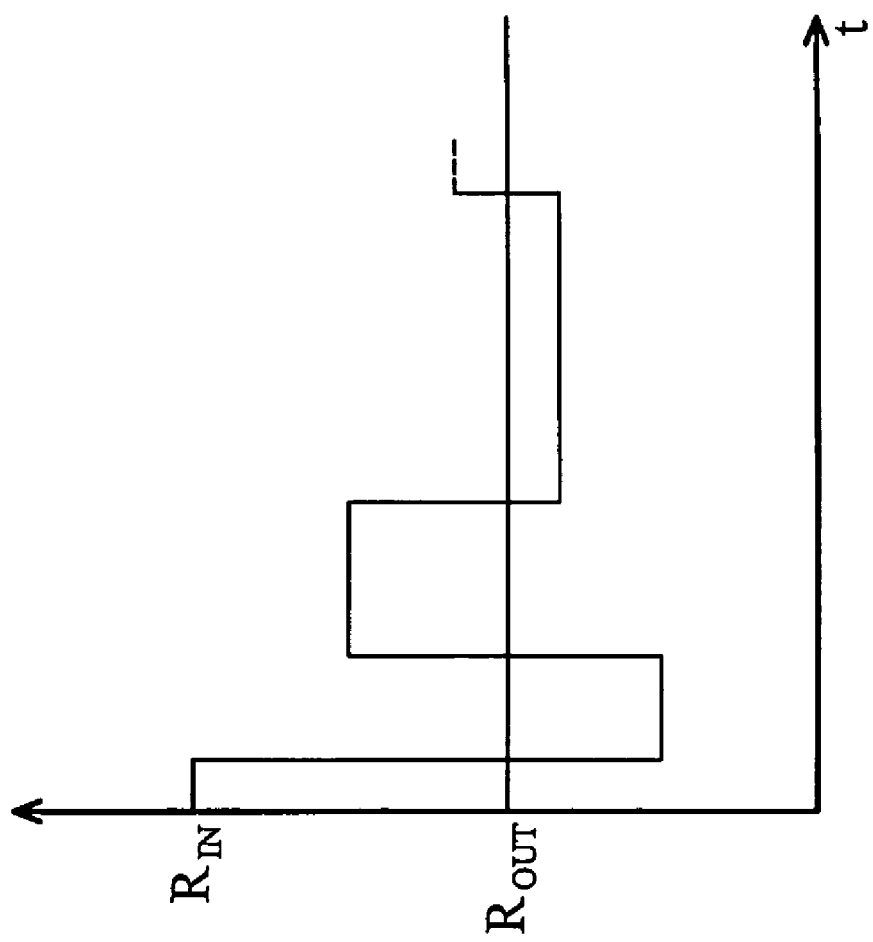

METHOD AND APPARATUS FOR DATA RATE CONTROL

BACKGROUND OF THE INVENTION

1. Field of the Invention

The invention relates to data rate controls, and in particular, to an isochronous device adapted in Universal Serial Bus (USB) connections.

2. Description of the Related Art

Universal Serial Bus (USB) is a prevailing technology for data transmission. FIG. 1 shows a conventional USB device 120 coupled to a first device 110 through a USB connection. The first device 110 is a data source that sends an input data stream $\#D_{IN}$ to the USB device 120 at a first data rate. The USB device 120 comprises a buffer 122 and a second device 124. The buffer 122 buffers the input data stream $\#D_{IN}$ before outputting it to the second device 124. The second device 124 serves as a data receiver that pulls an output data stream $\#D_{OUT}$ from the buffer 122 at an output data rate. To maintain synchronicity, the first data rate is designated to be identical to the output data rate. In practice, however, there are always clock mismatches between clock generators (not shown) within each of the first device 110 and second device 124, thus the synchronicity of the input and output data rates is an issue to be solved.

There exist various approaches to synchronize mismatches of data rates between the first device 110 and second device 124. For example, according to US patent application publication US/20060209684, Bei et al. discloses "DATA RATE CONTROLRE AND METHOD OF CONTROL THEREOF", an isochronous circuit is provided to monitor the occupation of the buffer 122 and generate a feedback signal to adjust the first data rate when sending the input data stream $\#D_{IN}$. Specifically, the occupation of the buffer 122 is categorized into a plurality of levels, such as high, medium and low. The feedback signal increases or decreases the first data rate according to the capacity levels. Data rate variations of the input data rate $R_{IN}$ and output data rate $R_{OUT}$ in the buffer 122 are shown in FIG. 2. The output data rate $R_{OUT}$ may be a constant value, whereas the input data rate $R_{IN}$ is adjusted periodically to prevent the buffer 122 from overrun or under run. With the approach disclosed by Bei et al, however, buffer swing, or variations between the peak and the bottom of the capacity, is too large to reduce the buffer size.

In most applications, buffer size is critical when considering costs, thus desirability is for smallest size possible. If a small buffer is implemented using Bei's method, there is still a high probability to induce undesirable buffer overrun or under run. Therefore, an improved architecture is desirable.

BRIEF SUMMARY OF THE INVENTION

An exemplary embodiment of an isochronous circuit of the invention is provided to control data transmission between a first device and a second device. The first device outputs a set of data packets to the isochronous circuit at a first data rate, and the second device pulls the set of data packets from the isochronous circuit at a second data rate. The isochronous circuit comprises a buffer, a rate calculator and a register. The buffer buffers the set of data packets bound to the second device through a USB. The rate calculator monitors occupation of the buffer to estimate the second data rate. The register is coupled to the rate calculator for storage of the estimated second data rate. The first device may access the estimate of the second data rate from the register to update the first data rate.

When calculating the estimate of the second data rate, the rate calculator counts a time counter starting from a base time point, and a capacity variation from the base time point. When the capacity variation exceeds a predetermined threshold, the rate calculator calculates a variation rate based on the capacity variation and the time counter, and estimates the second data rate based on the first data rate and the variation rate. In one embodiment of the invention, the register triggers the first device to read the estimate of the second data rate by sending an interruption signal to the first device. When the first data rate is adjusted by the first device, the rate calculator may reset the time counter to count a new capacity variation from a new base time point. Furthermore, the rate calculator may detect the correctness and effectiveness of the adjustment of the first data rate by checking whether the variation rate converges. If it is converged, another round of the second data rate estimation is proceeded.

Another embodiment of the invention is a rate control method implemented on the described isochronous circuit. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4b shows capacity variation of the buffer according to the embodiment in FIG. 4a; and FIG. 5 shows data rate variations of the input and output data rates $R_{IN}$ and $R_{OUT}$ according to the embodiment in FIG. 3.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
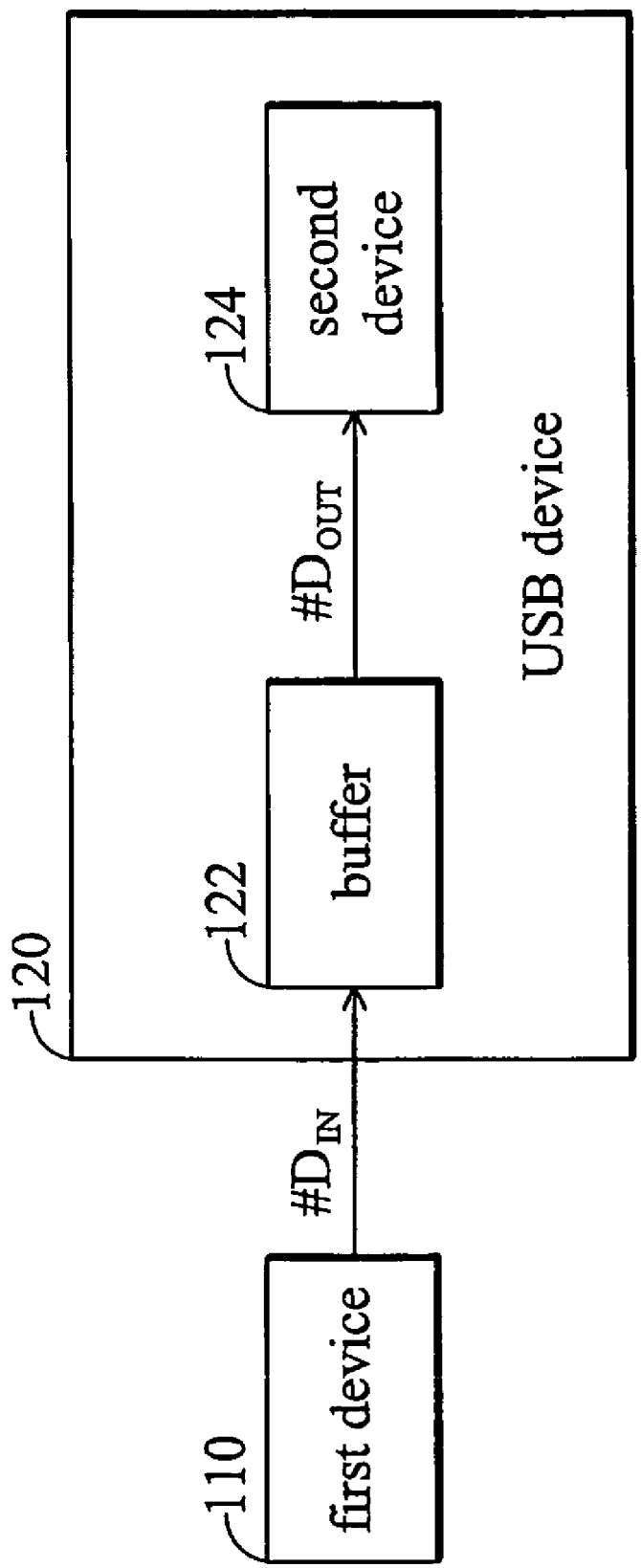
FIG. 1 shows a conventional USB device 120 coupled to a first device 110 for data transmission.
Figure 2:
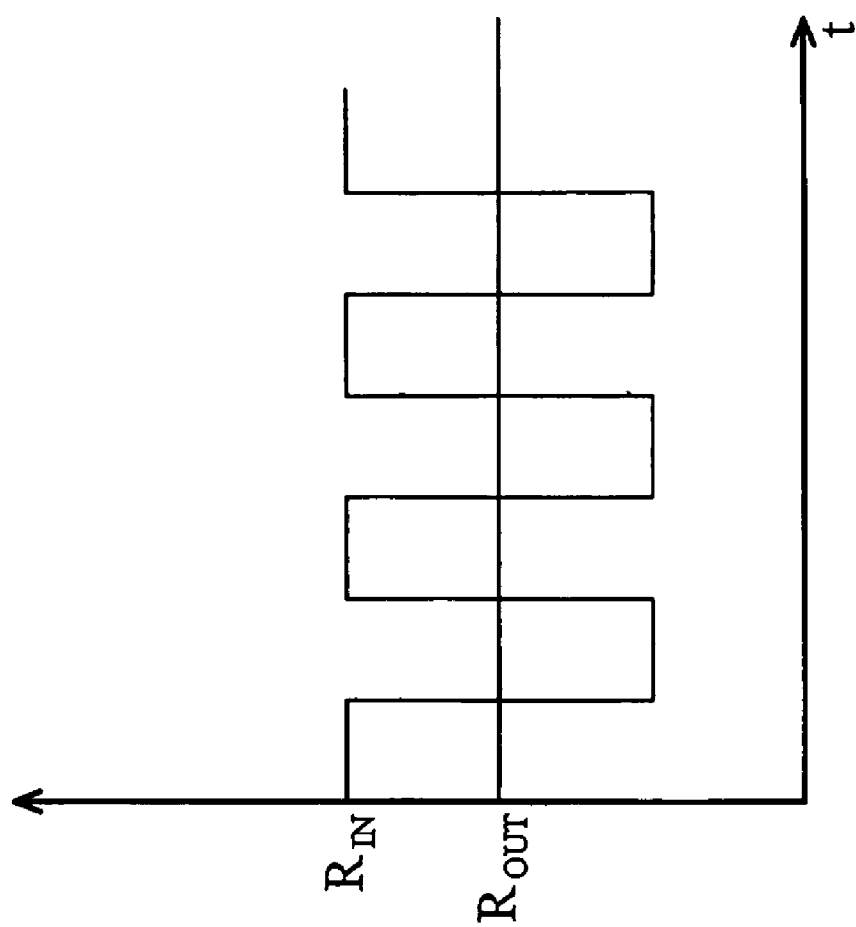
FIG. 2 shows conventional data rate variations of the input and output data rates $R_{IN}$ and $R_{OUT}$ in the buffer 122.
Figure 3:
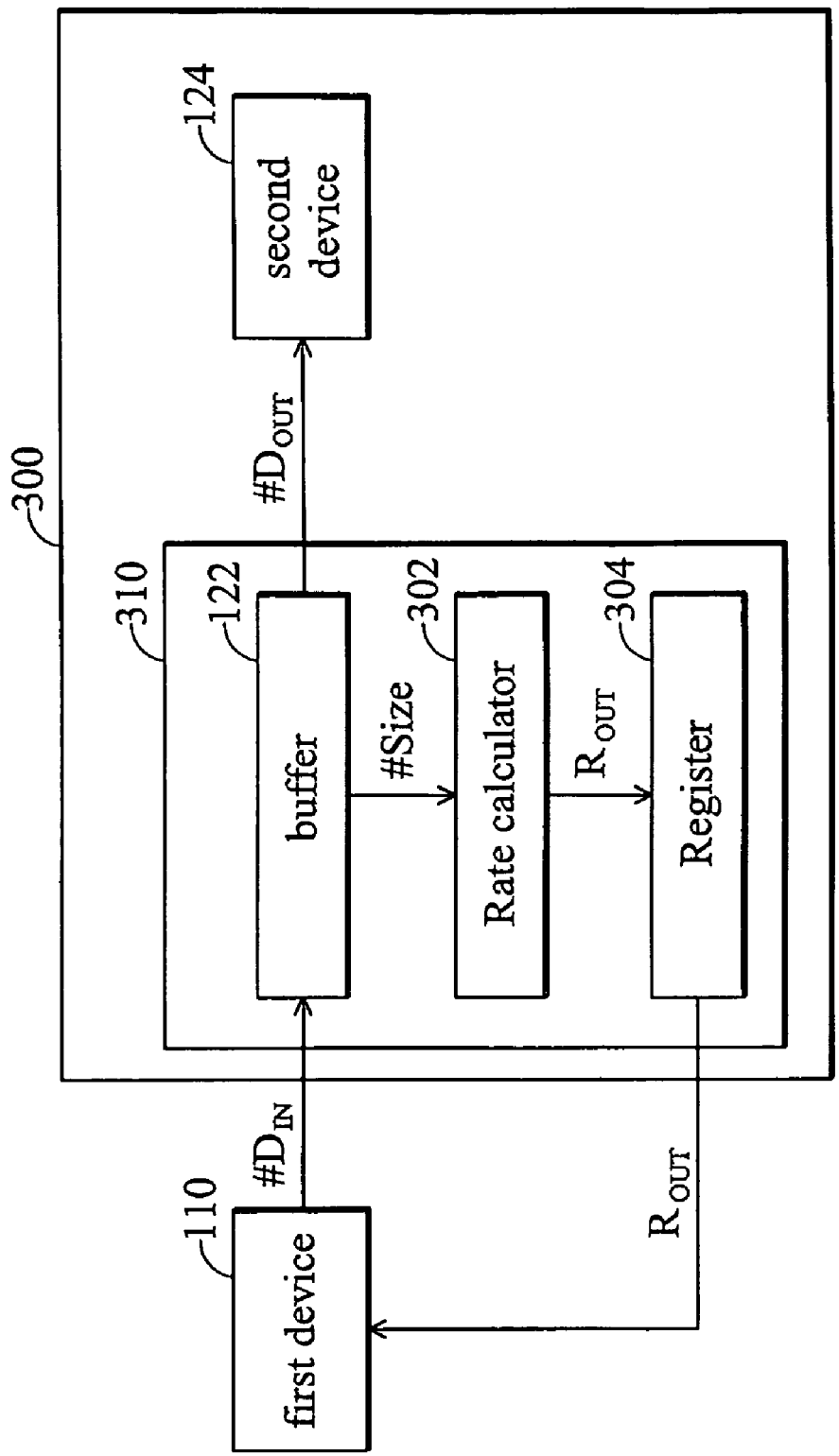
FIG. 3 shows an embodiment of a USB device 300 according to the invention.

FIG. 3 shows an embodiment of a USB device 300 according to the invention. The USB device 300 may be an audio player, and the first device may be a host computer outputting music to the USB device 300. The USB device 300 comprises an isochronous circuit 310 for control of data transmission between the first device 110 and second device 124. In this case, the second device 124 may be a player module processing the music to play in real time, so the data rate is a critical parameter. The isochronous circuit 310 comprises a buffer 122, a rate calculator 302 and a register 304. When initialized, an input data stream $\#D_{IN}$ is transmitted from the first device 110 to the buffer 122 at a first data rate, and the second device 124 pulls an output data stream $\#D_{OUT}$ from the buffer 122 at a first data rate. Alternatively, the output data stream $\#D_{OUT}$ may not be pulled by the second device 124, but can be actively fed from the buffer 122 to the second device 124.

Technically, input and output data rates are theoretical data rates respectively reported from the first device 110 and second device 124. However, due to clock mismatches, the theoretical data rates may not be identical to those really flowing in the buffer 122. Therefore, the rate calculator 302 is designated to estimate the real data rates, especially the output data rate $R_{OUT}$ for further synchronization.

As the data transmission proceeds, occupation of the buffer 122 is constantly varying. For example, if the input data rate $R_{IN}$ is greater than the output data rate $R_{OUT}$, the buffer 122 may gradually reach a full level. Conversely, if the output data rate $R_{OUT}$ is higher than the input data rate $R_{IN}$, the buffer 122 may be drained out after a certain time. The rate calculator 302 constantly monitors occupation of the buffer 122, and upon a necessary condition, it calculates an estimate of the output data rate $R_{OUT}$ as a basis for adjusting the input data rate $R_{IN}$. A register 304 is coupled to the rate calculator 302 for storage of the estimated output data rate $R_{OUT}$. The register 304 is accessible by the first device 110, serving to feedback the estimate of the output data rate $R_{OUT}$ to the first device 110. The first device 110 may spontaneously reads the register 304 for updated data, or passively triggered by an interruption signal issued by the isochronous circuit.

The connection between the first device 110 and the USB device 300 may be a Universal Serial Bus (USB). According to USB standard, a value may be fed back to the first device 110 to adjust the input data rate. In the embodiment, the value is designated to be the output data rate $R_{OUT}$ of the output data stream #$D_{OUT}$. To calculate the output data rate $R_{OUT}$, the rate calculator 302 counts a capacity variation within a period of time. The period of time is counted by a time counter starting from a base time point, and simultaneously, the capacity variation is monitored from the base time point. When the capacity variation exceeds a predetermined threshold $C_{TH}$ after a certain period, for example, one hundred of samples, a variation rate $R_V$ can be estimated:

$$R_V = R_{IN} - R_{OUT} = C_V/T_C \quad (1)$$

where $C_V$ is the counted capacity variation during the certain period, and $T_C$ is the certain period. The unit of capacity may be sample number, and the period may be counted in mini-seconds, thus the variation rate $R_V$ can be denoted in samples per mini-second (S/ms).

Assuming that the clock used by the first device 110 that reports the input data rate $R_{IN}$ is a standard clock, an estimate of the output data rate $R_{out}$ can therefore be calculated based on the variation rate $R_V$ and the input data rate $R_{IN}$:

$$R_{OUT} = R_{IN} - R_V \quad (2)$$

Whereby, the estimate of the output data rate $R_{OUT}$ is stored in the register 304. When an adjustment is required, the first device 110 may be triggered to access the isochronous circuit 310 and to read the estimate of the output data rate $R_{OUT}$ from the register 304 as a feedback value for adjusting the input data rate $R_{IN}$. Specifically, the first device 110 may be passively triggered by the isochronous circuit 310 to retrieve the estimate of the output data rate $R_{OUT}$. Alternatively, the first device 110 may periodically trigger itself to access the isochronous circuit 310 for retrieval of the estimate of the output data rate $R_{OUT}$.

When the isochronous circuit 310 detects that the first device 110 has retrieved the output data rate $R_{OUT}$ from the isochronous circuit 310, the time counter in the rate calculator 302 may be reset to count a new capacity variation starting from a new base time point, and thereby the input data rate adjustment is recursively proceeded. Furthermore, from the output data rate $R_{OUT}$ is recursively updated and fed back to the first device 110, a mechanism is required to avoid the feedback loop to be diverged. After the rate calculator 302 updates the register 304, the rate calculator 302 detects whether the adjustment of the input data rate $R_{IN}$ stabilizes the capacity variation rate. If the capacity variation rate does not converge after the adjustment, the rate calculator 302 does not proceed another round of output data rate $R_{OUT}$ estimation. In other words, the rate calculator 302 repeats the output data rate ROUT estimation only when the adjustment takes effect.

In brief, the embodiment provides a feedback mechanism that directly informs the first device 110 a desired data rate. A flowchart of rate control according to the embodiment is shown in FIG. 4. In step 401, a rate control method is initialized. In the isochronous circuit 310, data transmission between a first device 110 and a second device 124 is controlled. In step 403, the first device 110 outputs a set of data packets to a buffer 122 at an input data rate $R_{IN}$, and the second device 124 polls the set of data packets from the isochronous circuit 310 at an output data rate $R_{OUT}$. Currently, the mismatch between $R_{IN}$ and $R_{out}$ is undetermined.

In step 405, a counter is initialized to count an elapsed time, and simultaneously, occupation of the buffer 122 is periodically monitored. In step 407, the capacity variation $C_V$ calculated based on the counter, is compared with a predetermined threshold $C_{TH}$. If the capacity variation $C_V$ does not exceed the predetermined threshold $C_{TH}$, step 409 is processed, in which the time counter keeps counting the elapsed time while the capacity of buffer 122 keeps being monitored. If the capacity variation $C_V$ exceeds the threshold $C_{TH}$, step 411 is processed, whereby the rate variation $R_V$ is calculated as described in formula (1), and the output data rate $R_{OUT}$ is accordingly estimated. In step 413, the rate calculator 302 updates the register 304 with the estimated output data rate $R_{OUT}$ In step 415, the rate calculator 302 waits for the output data rate $R_{OUT}$ to be fed back to the first device 110. As described, the feedback may be triggered by an interruption signal transmitted from the register 310 to the first device 110, or periodically polled by the first device itself. The process progresses to step 417 thereafter.

In step 417, the correctness of the new estimated output data rate is checked. The adjustment is deemed correct if a newly estimated capacity variation rate $R_V'$ has an opposite polarity to the old one $R_V$, or if a newly estimated output data rate $R_{OUT}$ gets closer to the input data rate $R_{IN}$. occupation of the buffer 122 converges to a desired level. The desired level is a balanced point safe from buffer under-run or overrun, preferably 50% of the maximum capacity of the buffer. Ideally, the differences between the input and output data rates $R_{IN}$ and $R_{OUT}$ are supposed to be converged to each other, and eventually reach an identical level. The occupation of the buffer is subsequently fixed at the desired level.

If the adjustment causes a diverged result, the process immediately loops back to step 405 to perform another data rate estimation and adjustment. Conversely, if the adjustment effectively causes the occupation of the buffer 122 to converge to the desired level, step 419 is processed.

In step 419, occupation of the buffer 122 is monitored. By the time when a successful adjustment is performed, the occupation of the buffer 122 gradually approximates the desired level, and during which, there is no need to perform another data rate estimation and adjustment. Thus in step 419, the rate calculator 302 does nothing but monitoring the occupation of the buffer 122. When the occupation of the buffer 122 meets or crosses the desired level, the process loops to 405, and another cycle of rate control is initiated.

Figure 4A:
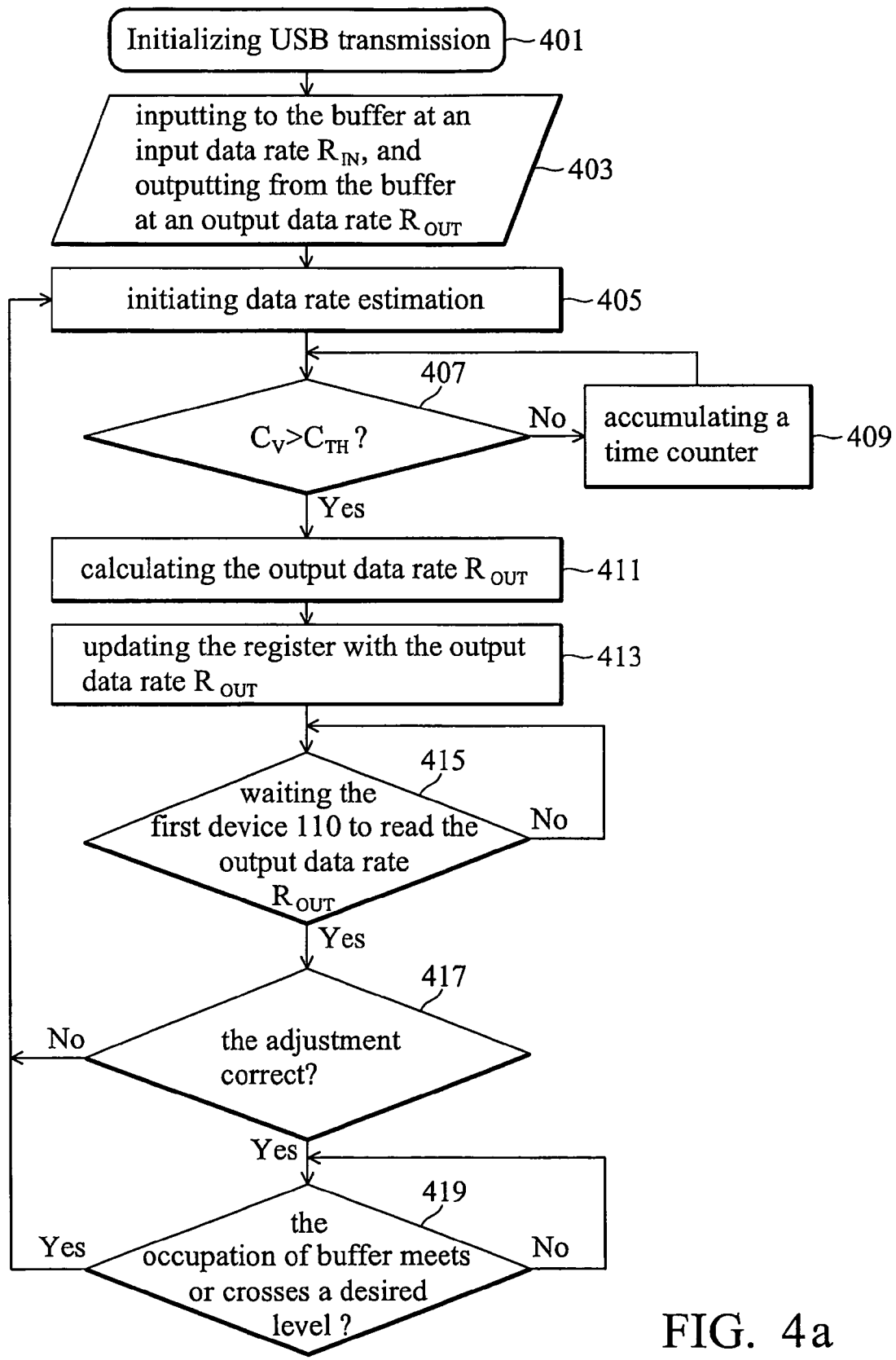
FIG. 4a shows a flowchart of rate control according to the embodiment in FIG. 3.
Figure 4B:
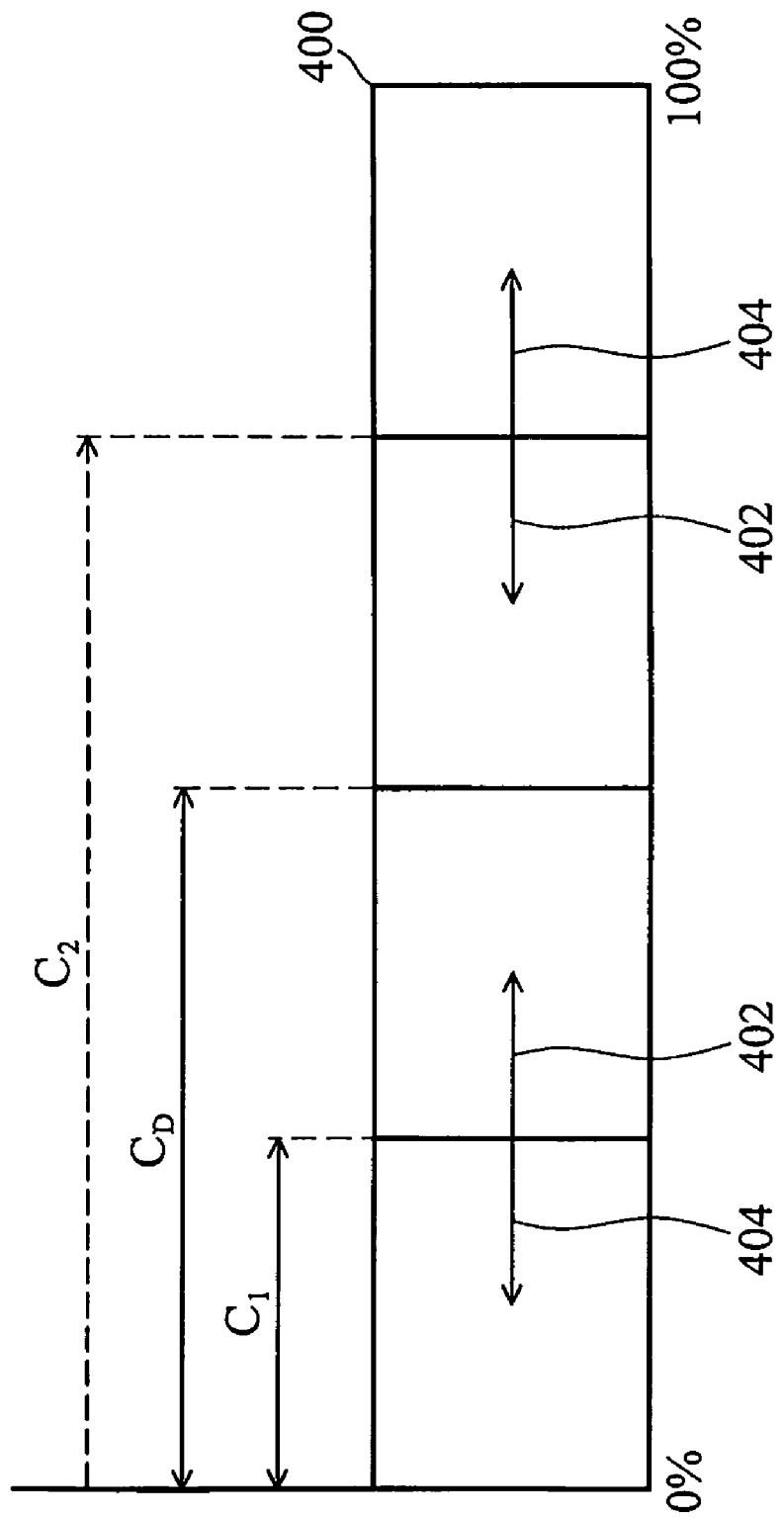

FIG. 4b shows an embodiment of buffer occupation according to the steps in FIG. 4a. The buffer occupation 400 ranges from 0% to 100%, and a desired level CD is designated in the middle line. When the data rate adjustment is performed, the buffer occupation may coincidently have a lower level $C_1$ or a higher level $C_2$. In step 417 of FIG. 4a, the buffer occupation is checked. If the buffer occupation moves toward the desired level $C_D$ (arrows 402), it is deemed converged. Conversely, if the buffer occupation moves outward the desired level $C_D$ (arrows 404), it is deemed diverged.

FIG. 5 shows data rate variations of the input and output data rates $R_{IN}$ and $R_{OUT}$ according to the embodiment in FIG. 3. From the output data rate $R_{OUT}$ is directly fed back to the first device 110 as a desired input data rate $R_{IN}$, the mismatches between input and output rates $R_{IN}$ and $R_{OUT}$ can be gradually converged, and eventually fully matched. An example is shown in FIG. 5, in which the difference between input and output rates $R_{IN}$ and $R_{OUT}$ converges with time. In practice, the difference may converge in another way, and is not limited to the example. The advantage in the embodiment is that buffer swing is significantly reduced, allowing the approach to be implemented in a smaller buffer without suffering undesirable buffer under run or overrun.

The first device 110 described in FIG. 3 may be a host computer, whereas the USB device 300 is a removable device coupled to the first device 110, such as an audio device or thumb disk. The isochronous circuit 310 is used to control data transmission from the first device 110 to the second device 124; however, it is not limited thereto. Conversely, when data is to be transmitted from the second device 124 to the first device 110, the isochronous circuit 310 is also adaptable in the transmission. Although the connection between the first device 110 and USB device 300 uses a Universal Serial Bus (USB), the method disclosed in the invention is not limit thereto.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An isochronous circuit, for controlling data transmission between a first device and a second device, wherein the first device outputs a set of data packets to the isochronous circuit at a first data rate and the second device pulls the set of data packets from the isochronous circuit at a second data rate, and the isochronous circuit comprising:
    a buffer, coupled to the first device through a bus, buffering the set of data packets bounded to the second device;
    a rate calculator, coupled to the buffer, monitoring occupation of the buffer to estimate the second data rate, wherein the rate calculator comprises
        counting a time counter (Tc) starting from a base time point,
        calculating a capacity variation (Cv) since the base time point,
        calculating a variation rate (Rv) based on the capacity variation and the time counter if the capacity variation exceeds a predetermined threshold, and
        estimating an estimation of the second data rate based on the first data rate and the variation rate; and
    a register, coupled to the rate calculator for storage of the second data rate stored by the rate calculator, and accessed periodically by the first device, whereby the estimation of the second data rate is used to update the first data rate of the first device;
    wherein the rate calculator checks whether the occupation of the buffer converges to a desired level such that
        if it is not converged, the rate calculator repeat the estimation of the second data rate immediately, and
        if it is converged, the rate calculator holds until the occupation of the buffer meets or crosses the desired level, and repeat the estimation of the second data rate.

2. A rate control method, for an isochronous circuit to control data transmission between a first device and a second device, comprising:
    the first device outputting a set of data packets to the isochronous circuit at a first data rate;
    the isochronous circuit buffering the set of data packets bound to the second device in a buffer;
    the second device pulling the set of data packets from the isochronous circuit at a second data rate;
    monitoring occupation of the buffer to estimate an estimation of the second data rate, wherein the estimation of the second data rate comprises:
        counting a time counter (Tc) starting from a base time point,
        calculating a capacity variation (Cv) since the base time point, and
        when the capacity variation exceeds a predetermined threshold, calculating a variation rate (Rv) based on the capacity variation and the time counter, and estimating the estimation of the second data rate based on the first data rate and the variation rate;
    storing the estimation of the second data rate in a register which is periodically accessed by the first device, thereby updating the first data rate based on the estimate of the second data rate in the register; and
    checking whether the occupation of the buffer converges to a desired level, such that if the buffer is not converged, repeat the estimation of the second data rate immediately, and if the buffer is converged, keeping monitoring the occupation of the buffer until the desired level is met, and repeat the estimation of the second data rate.

3. The isochronous circuit as claimed in claim 1, wherein the register triggers the first device to read the estimate of the second data rate by sending an interruption signal to the first device.

4. The isochronous circuit as claimed in claim 3, wherein the rate calculator resets the time counter to count a new capacity variation from a new base time point when the first data rate is adjusted by the first device.

5. The isochronous circuit as claimed in claim 1, wherein the bus is Universal Serial Bus (USB).

6. The rate control method as claim in claim 2, further comprising triggering the first device to retrieve the estimate of the second data rate from the buffer by sending an interruption signal to the first device.

7. The rate control method as claim in claim 2, further comprising the first device autonomously polls the estimate of the second data rate from the buffer every predetermined interval.

8. The rate control method as claimed in claim 2, further comprising resetting the time counter to count a new capacity variation from a new base time point when the first data rate is updated.

9. The rate control method as claimed in claim 2, wherein the data transmission between the first device and the second device is through a Universal Serial Bus (USB).

10. The isochronous circuit of claim 1, wherein the rate calculator calculating the variation rate comprises Rv=Cv/Tc.

11. The rate control method of claim 2, wherein the estimation of the second data rate comprises $Rv=Cv/Tc$.

12. The isochronous circuit of claim 1, wherein the desired level is a balanced point at fifty percent of maximum capacity of the buffer.

13. The rate control method of claim 2, wherein the desired level is a balanced point at fifty percent of maximum capacity of the buffer.

* * * * *